INVENTOR.
ALFREDO S. SHENG
BY John V. Regan
Attorney

INVENTOR
ALFREDO S. SHENG
BY John V. Regan
ATTORNEY

INVENTOR
ALFREDO S. SHENG
BY John V. Regan
ATTORNEY

United States Patent Office
3,430,071
Patented Feb. 25, 1969

3,430,071
LOGIC CIRCUIT
Alfredo S. Sheng, Cherry Hill, N.J., assignor to Radio Corporation of America, a corporation of Delaware
Filed Apr. 5, 1965, Ser. No. 445,482
U.S. Cl. 307—247 9 Claims
Int. Cl. H03k 17/00, 19/02, 19/34

This invention relates to logic circuits and, in particular, to an improved multi-level logic circuit.

An information handling system, a digital computer for example, may comprise a large plurality of NOR gates connected in various configurations. Alternatively, combinations of AND gates, OR gates, and inverters may be used. When transistors have been used as the active elements in the various logic gates, it has been common practice to operate the transistors between cut-off and deep saturation in order to provide two well-defined signal or logic levels. Operation of a transistor in saturation is accompanied by minority carrier storage effects which result in circuit delay when the transistor is turned off. This delay can be reduced, at least in part, by the addition of circuitry for providing a hard turn-off overdrive for the transistor, but this usually requires relatively large signal swings. Turning the transistor on from a cut-off condition also introduces additional delays.

In order to provide a high speed circuit which has reduced signal delays, it has been suggested that the logic gates take the form of a current steering logic circuit. In such a circuit, a number of amplifying devices, such as transistors for example, have their emitters connected in common to a source of substantially constant current. The collector-emitter paths of all except one of the transistors are connected in parallel, and a common collector resistor is provided for these transistors. The input or logic signals are applied to the base electrodes of these transistors. The remaining transistor has its base electrode connected to a source of fixed potential which lies within the range between the two levels of logic signals. A separate collector resistor is provided for this latter transistor.

In the operation of a current steering logic circuit, the current from the substantially constant current source is steered either through one or more of the signal receiving transistors and thence through the common collector resistor, or the current is steered through the additional transistor which has the fixed bias. A first output is derived at the collector of the "reference" transistor and a second, complementary output appears at a point common to the collectors of the signal receiving transistors. The number of output loads which can be connected directly at these points is limited for the reason that the load current would flow through the collector resistors and have the effect of changing the output voltage levels with changing load conditions, since the transistors are not operated in saturation.

In order to provide a large fan-out, or number of output loads, without seriously affecting the output signal levels, it has been proposed to provide emitter followers as buffers between the outputs of the current steering logic gate and the loads to be driven thereby. Since an emitter follower has an inherently high input impedance, it has only a small loading effect at the output of the current steering logic gate. The emitter follower also serves to provide gain and may also be used for signal level restoration. However, the emitter follower, or emitter followers, perform the aforementioned functions at the expense of an extra stage delay.

It is one object of this invention to provide an improved current steering logic arrangement in which an additional level of logic is performed without additional circuit delay.

It is another object of this invention to provide an improved current steering logic arrangement in which the emitter followers of two or more circuits are connected in parallel, whereby the emitter followers serve the additional function of performing a logical operation without any increase in circuit delay.

In apparatus embodying the invention, current steering logic gates are employed for performing a first level of logic. The separate output of each current steering logic gate is coupled to a different emitter follower, and the emitter follower transistors of several stages are connected in parallel to accomplish a second level of logic.

In the accompanying drawing, like reference characters denote like components; and FIGURE 1 is a schematic diagram of an emitter coupled current steering logic (ECCSL) arrangement according to the prior art;

Figure 1:
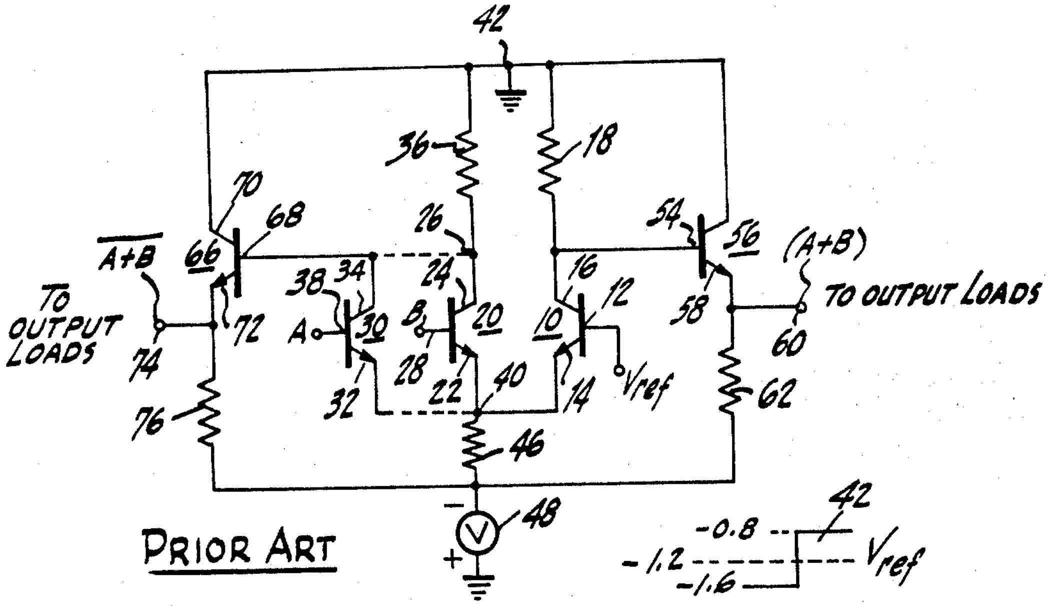

In the prior art circuit of FIGURE 1, the current steering logic portion of the circuit is illustrated as comprising transistors 10, 20 and 30. Transistor 10 has its base electrode 12 connected to a source or point of reference potential, designated "$V_{ref}$," and has its emitter electrode 14 connected to a common emitter junction 40. The collector electrode 16 of this transistor is connected by way of a current supply resistor 18 to a second junction 42.

The other transistors 20, 30 have their emitter electrodes 22, 32, respectively, connected together and to the first junction point 40. The collectors 24, 34 of these transistors are connected together at a junction 26, and by way of a current supply resistor 36 to the junction 42. As indicated by the dashed lines between emitters 22 and 32 and collectors 24 and 34, other transistors (not shown) may have their collector-emitter paths connected in parallel with those of transistors 20 and 30.

A first logic input signal A is applied at the base electrode 38 of transistor 30, and a second logic input signal B is applied at the base 28 of transistor 20. Each of these latter signals or levels may have either of two values, depending upon whether the input is representative of a binary "1" or a binary "0" bit of information. In a particular system, a binary "1" bit may be represented by a signal or level of −0.8 volt, and a binary "0" may be represented by a signal or level of −1.6 volts, as illustrated by the waveform 42 at the lower right of FIGURE 1. Preferably, the reference voltage $V_{ref}$ is chosen to have a value approximately midway between the two voltage signal levels in order to provide approximately fifty percent noise immunity for noise voltage of either polarity. For the conditions given above, $V_{ref}$ may have a value of −1.2 volts.

A common emitter resistor 46 is connected between the common emitter junction 40 and the negative terminal of a source 48 of V volts. The positive terminal of source 48 is grounded, as is the junction 42 at the upper ends of the collector resistors 18, 36.

The collector 16 of transistor 10 is connected to the base electrode 54 of a transistor 56. This transistor 56 is connected in the grounded collector configuration and has its emitter electrode 58 connected to an output terminal 60, and by way of an emitter resistor 62 to the negative terminal of source 48. Transistor 56 and its related circuitry function in the well-known manner as an emitter follower. A second emitter follower transistor 66 has its base electrode 68 connected at the junction 26 common to the collector electrodes 24 and 34. The collector 70 of transistor 66 is grounded, and its emitter 72 is connected to a second output terminal 74, and by way of an emitter resistor 76 to the voltage source 48.

In the operation of the circuit, transistor 10 conducts when both of the inputs A and B are at the −1.6 volt level. Transistors 20 and 30 then are biased in the cut-off condition. Current, in the conventional sense, flows from circuit ground through collector resistor 18, the collector-emitter path of transistor 10, and through common emitter resistor 46 to the voltage source 48. The voltage at the collector 16 is determined primarily by the value of resistors 18 and 46 and the value of the voltage source 48. These parameters are selected so that the voltage at the collector 16 has a value of approximately −0.8 volt when transistor 10 is in conduction (assuming a voltage drop of 0.8 volt across the emitter-base junction of a conducting transistor). For the given conditions, the voltage at the common collector junction 26 of the other transistors is at ground potential, since these transistors are in a nonconducting state.

When either or both of the inputs A and B are at −0.8 volt representing a binary "1," transistor 10 is nonconducting and the voltage at its collector electrode 16 is at ground potential. All of the current from the source 48 flows through one or both of the transistors 20, 30 depending upon the input signals, and through the common collector resistor 36. Resistor 36 is selected in value so that the voltage at common collector junction 26 is approximately −0.8 volt when either of the transistors 20 or 30, or both, conduct.

In the usual type computer system, a logic circuit may be required to drive a large number of output loads, such as other logic circuits. If these other circuits were connected directly at the common collector junction 26 or at the collector 16, a large load current would flow through the collector resistors 18 or 36, and could seriously affect the voltage levels at these points. This is so since the transistors are not connected in the grounded emitter configuration, do not operate in saturation, and have no voltage clamping means at the collectors. In order to avoid this condition, the emitter follower transistors 56 and 66 and their related circuitry are provided to isolate the output loads from the collectors of the transistors 10, 20 and 30. As is known, an emitter follower transistor has a very high input impedance, whereby its base current is relatively small. This small base current flowing through the associated collector resistor 18 or 36 does not seriously affect the voltage at the collectors of the transistors 10, 20 and 30.

When the voltage at the common collector junction 26 is at ground potential, the voltage at the emitter electrode 72 of transistor 66 and at the output terminal 74 has a value of −0.8 volt, assuming a voltage drop of 0.8 volt across the emitter-base junction of the transistor. On the other hand, when the voltage at common collector junction 26 is at −0.8 volt, the voltage at output terminal 74 has a value of −1.6 volts.

It will be noted that these two output levels are the levels representing a binary "1" and a binary "0," respectively, as discussed previously. By similar reasoning, it can be shown that the voltage at the other output terminal 60 has a value of −0.8 volt when the voltage at collector electrode 16 is at ground potential, and has a value of −1.6 volts when the voltage at collector 16 is at −0.8 volt.

In summary of the operation it may be said that the output voltage at output terminal 74 is −0.8 volt only when both of the inputs A and B are at −1.6 volts. Thus, the output at terminal 74 is the NOR function $\overline{A+B}$. The output voltage at the other terminal 60 is at −0.8 volt, representing a binary "1" whenever either or both of the A and B inputs are at −0.8 volt. Thus, the output at terminal 60 is the OR function $(A+B)$.

The emitter follower transistors 56 and 66 and their related circuitry provide amplification as well as the aforementioned functions of signal level restoration and buffering between the output loads and the outputs of the current steering logic gate. It should be appreciated, however, that these functions are achieved at the expense of an additional stage of signal delay. That is to say, there is a time delay between the time of application of a signal to the base of one of the transistors 56, 66 and the time of occurrence of the output therefrom. According to my invention, to be described in detail hereinafter, the emitter followers of several stages are combined in a manner whereby they perform an additional level of logic without any increase in delay over that of the prior art circuit. In order to more fully appreciate the advantages provided by my novel circuit arrangement, the usual technique of combining several NOR/OR gates in a multi-level logic arrangement will first be discussed. Such an arrangement is illustrated in block form in FIGURE 2.

Figure 2:
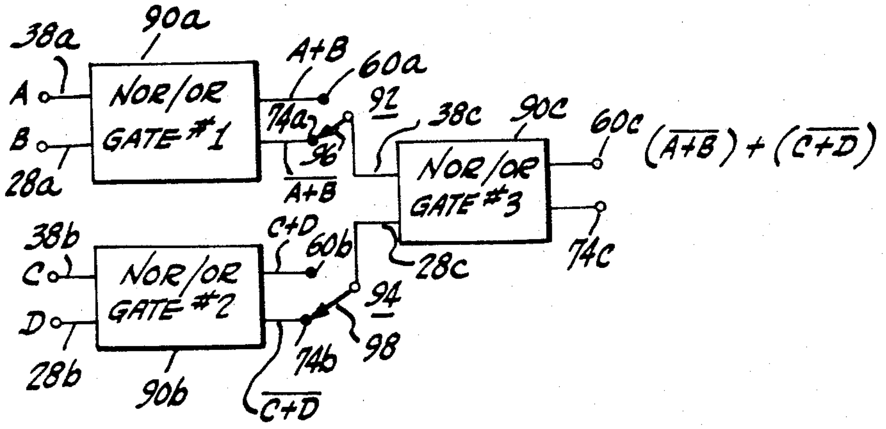
FIGURE 2 is a diagram, in block form, illustrating the manner in which several of the prior art ECCSL circuits may be combined to perform a multi-level logic function.

In FIGURE 2, blocks 90*a*, 90*b* and 90*c* represent first, second and third NOR/OR gates of the type illustrated in FIGURE 1. The input lines 28*a*, 28*b* and 28*c* to these blocks correspond to the base inputs of one of the signal receiving transistors in each of the respective NOR/OR gates (for example, the transistor corresponding to transistor 20 of FIGURE 1). Each of the other inputs 38*a* . . . 38*c* of FIGURE 2 corresponds to the base input of the other signal receiving transistor in each of the NOR/OR gates 90*a* . . . 90*c*, respectively. The output terminals 60*a* . . . 60*c* and 74*a* . . . 74*c* correspond to the output termianls 60 and 74 in FIGURE 1, the alphabetic characters *a, b, c* being added to the reference numerals to differentiate among the different NOR/OR gates.

In a practical application, one of the outputs of each of the first and second gates 90*a* and 90*b* could be connected directly (wired) to a different one of the input points 28*c* and 38*c* of the third gate 90*c*. For tutorial purposes, and in order to more adequately describe the operation of the circuit for different logic conditions, there is illustrated in FIGURE 2 a pair of switches 92 and 94 having respective switch arms 96 and 98 which may be selectively moved between the various output terminals of the first and second gates 90*a*, 90*b*. These switch arms 96 and 98 are illustrated as being in contact, respectively, with the output terminals 74*a* and 74*b* of gates 90*a* and 90*b*.

As described previously in connection with FIGURE 1, the output at terminal 74*a* is the NOR function $\overline{A+B}$ when the gate 90*a* receives inputs A and B. Likewise the signal or level appearing at output terminal 74*b* is the NOR function $\overline{C+D}$ when the inputs to the gate 90*b* are signals C and D. The third gate 90*c* produces at output terminal 74*c* a signal or level which is the logical NOR function of the inputs to that gate, and the output at terminal 60*c* is a signal or level representing the OR function. Consequently, when the switch arms 96 and 98 are in the positions illustrated, a first input to the third gate 90*c* is a signal or level representing $\overline{A+B}$ and the second input is a signal or level representing $\overline{C+D}$. The output at terminal 60*c* is the OR function of these two inputs, expressed as $(\overline{A+B})+(\overline{C+D})$. Other outputs are possible by changing the setting of the switch arms 96 and 98. The four possible conditions of inputs and the corresponding output at terminal 60*c* are listed in the following table.

| Input 38c | Input 28c | Output 60c |
| --- | --- | --- |
| $\overline{A+B}$ | $\overline{C+D}$ | $(\overline{A+B})+(\overline{C+D})$ |
| $A+B$ | $C+D$ | $A+B + C+D$ |
| $A+B$ | $\overline{C+D}$ | $(A+B)+(\overline{C+D})$ |
| $\overline{A+B}$ | $C+D$ | $(\overline{A+B})+ C+D$ |

It should be noted that, to derive any of the functions listed in the table above according to the arrangement of FIGURE 2, there is not only a delay occasioned by the emitter followers in each of the NOR/OR gates 90*a* and 90b, but that the third gate 90c introduces a delay equivalent to that of its current steering logic circuit plus its emitter follower. For example, let it be assumed that the delay between the time of application of an input signal A or B and the time of occurrence of the output (at collector junction 26 of FIGURE 1, for example), is $t_1$. Let it further be assumed that the delay between the time of application of a signal at the base of an emitter follower and the time of occurrence of an output signal at the emitter thereof is $t_2$. Accordingly, each of the gates 90a, 90b and 90c has a total delay of $t_1+t_2$. In the FIGURE 2 arrangement, however, the signals are not applied at the input of the third gate 90c until a time $t_1+t_2$ following the application of the inputs to the gates 90a and 90b. Accordingly, the total delay between the time of application of the inputs A, B, C and D and the time at which an output signal or level appears at the output terminal 60c is the sum of the various delays, or $2(t_1+t_2)$. In my arrangement, which will now be described, the same functions listed in the table above are performed in a total time $t_1+t_2$, which is one-half of the signal delay of the FIGURE 2 arrangement. Also, only two NOR/OR gates are required.

Figure 3:
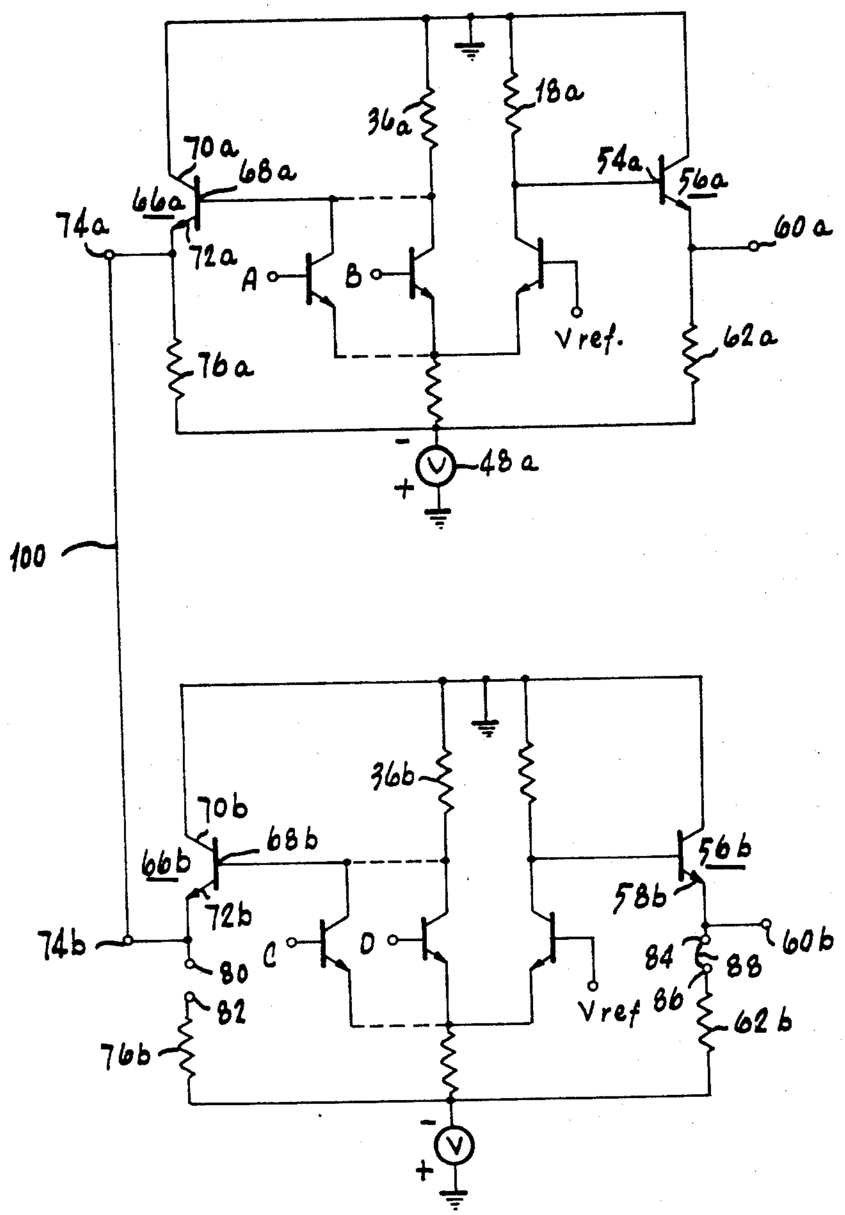
FIGURE 3 is a schematic diagram of a simplified multi-level logic circuit embodying the invention.

A novel logic circuit according to the invention is illustrated schematically in FIGURE 3 and comprises two NOR/OR gates of the type illustrated in FIGURE 1 and described previously. Those components in the upper circuit are given the same reference numerals as the circuit of FIGURE 1, but followed with the alphabetic character "*a*." Those components in the lower circuit of FIGURE 3 which correspond to components in the FIGURE 1 circuit are given the same reference numerals, but followed by the alphabetic character "*b*." In essence, the invention comprises the technique of connecting the emitter follower transistors of two or more NOR/OR logic gates in parallel. In an actual operating circuit, the desired connections of the emitter followers are made directly by way of leads or wires.

The emitter 72b of transistor 66b is connected to a terminal 80, and the associated emitter resistor 76b is connected at its upper end to a terminal 82. Transistor 56b has its emitter 58b connected to a terminal 84, and the upper end of the associated emitter resistor 62b is connected to a terminal 86. A wire or lead 100 is connected between the output terminal 74a of the upper logic circuit and the output terminal 74b of the lower logic circuit. No connections are made between the terminals 80 and 82. However, a lead or link 88 is connected between the terminals 84 and 86 in the emitter circuit of transistor 56b.

The purpose of leaving the terminals 80 and 82 unconnected is to prevent the paralleling of emitter resistors 76a and 76b. If the two resistors were paralleled, the total emitter current for the two transistors would be twice that of the emitter current in FIGURE 1, with a resulting increase in current in the base 68a, or 68b, under certain operating conditions. An increase in base current has the effect of increasing the current through the associated collector resistor, and it is desired to avoid this increase in order to avoid loading at the respective collector and possible shifting of the signal level thereat.

In the circuit as thus described, it may be seen that the emitter electrodes 72a and 72b of transistors 66a and 66b are connected together, and by way of emitter resistor 76a to the voltage source 48a. The collector electrodes 70a and 70b also are connected together since both are connected to circuit ground. Accordingly, the emitter-collector paths of these two transistors are connected in parallel, whereby these two transistors operate to perform the positive OR function. Since in the individual case, the output at terminal 74a is a binary "1" (−0.8 volt) when both the A and B inputs are binary "0," and since the output at terminal 74b is a binary "1" when both of the inputs C and D are binary "0," it is apparent that when the output terminals 74a and 74b are connected together, the common output at terminals 74a and 74b is the logical function $(\overline{A+B})+(\overline{C+D})$. The output at terminal 60a is the logical function $(A+B)$, and the output at terminal 60b is the logical function $(C+D)$.

The particular connections illustrated in FIGURE 3 are by way of example only of one type of logical function which can be performed by the circuitry. Other logical functions are possible depending upon the manner in which the two logic circuits are connected together and in dependence upon the connections between the terminals 80, 82 and 84, 86. Four alternative arrangements are illustrated in FIGURE 4, wherein only the latter terminals and the outputs terminals of upper and lower logic circuits are indicated.

Figure 4:
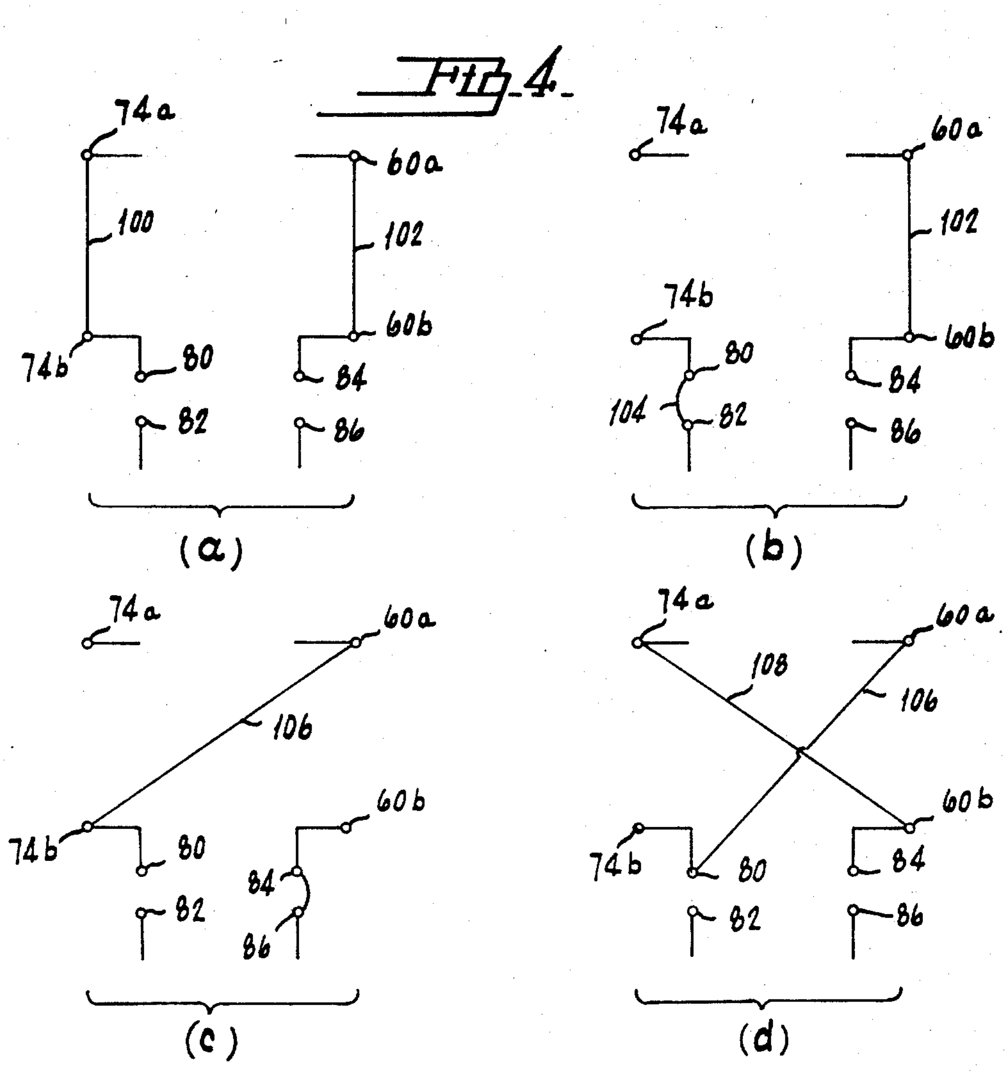
FIGURE 4 is a set of diagrams illustrating various connections which can be made in the FIGURE 3 circuit to perform various logical functions.

In FIGURE 4(*a*), output terminals 74a and 74b are connected by way of a lead or wire 100; output terminals 60a and 60b are connected by way of a lead or wire 102. Neither of the emitter terminals 80 and 84 is connected to its associated resistor terminals 82 and 86, respectively. In this arrangement, the emitter-collector paths of transistors 56a and 56b are connected in parallel, and resistor 62a is the common emitter resistor. Transistors 56a and 56b then operate as a positive OR gate, whereby the output at terminals 60a and 60b is the logical function $(A+B+C+D)$. The emitter-collector paths of transistors 66a and 66b also are connected in parallel, and resistor 76a is the common emitter resistor. The common output at terminals 74a and 74b is the function $$(\overline{A+B})+(\overline{C+D})$$

as in FIGURE 3.

In FIGURE 4(*b*), the output terminals 60a and 60b are connected together and the emitter terminals 84 and 86 are left unconnected, as in FIGURE 4(*a*). A link or wire 104 connects the terminals 80 and 82 in the emitter circuit of transistor 66b, while the output terminals 74a and 74b are not connected together. In this arrangement, the common output at output terminals 60a and 60b is the logical function $(A+B+C+D)$. The output at terminal 74a is the logical function $(\overline{A+B})$, and the output at the other terminal 74b is the function $(\overline{C+D})$.

In FIGURE 4(*c*) the output terminals 60a and 74b are connected by way of a wire 106. Also, emitter terminal 84 is connected by a wire or link to terminal 86. In the operation of this circuit, the emitter-collectors paths of transistors 56a and 66b are connected in parallel, and resistor 62a is the common emitter resistor. These transistors then operate as a positive OR gate, whereby the common output at terminals 60a and 74b is the logical function $(A+B)+(\overline{C+D})$. The output at terminal 74a is the function $(\overline{A+B})$, and the output at terminal 60b is the function $(C+D)$.

In FIGURE 4(*d*) output terminal 60a is connected by a lead 106 to terminal 80 (which is electrically the same point as terminal 74b). Output terminal 74a is connected by a lead 108 to output terminal 60b. In this arrangement the emitter-collector paths of transistors 66a and 56b are connected in parallel, and the common output at terminals 74a and 60b is the logical function $$(\overline{A+B})+(C+D)$$

The emitter-collector paths of transistors 56a and 66b also are connected in parallel at this time, whereby the common output at terminals 60a and 74b is the logical function $(A+B)+(\overline{C+D})$.

It should be clear from the foregoing description that, by the paralleling of the emitter follower transistors, applicant's novel arrangement is capable of producing any of the outputs which can be produced by the arrangement of FIGURE 2. It should be noted however that the logic is performed in parallel in the FIGURE 3 and FIGURE 4 arrangements, whereby the total time delay between the inputs and outputs of the circuit arrangement is $t_1+t_2$. In the FIGURE 2 arrangement, on the other hand, the logic is performed serially, whereby the total time delay between the inputs and outputs is $2(t_1+t_2)$, or twice the time delay of applicant's arrangement. Moreover, the FIGURE 2 arrangement requires three NOR/OR gates, whereas applicant's circiut arrangements require only two NOR/OR gates to perform the same function.

What is claimed is:

1. The combination comprising:

a first current steering logic gate including at least first, second and third amplifying devices each having an input electrode, an output electrode and a common electrode; a resistor having one terminal connected in common to each said common electrode; means for connecting the input electrode of the first amplifying device to a point of fixed potential; a first impedance element having one terminal connected to the output electrode of the first amplifying device; and a second impedance element having one terminal connected in common to the output electrodes of the second and third amplifying devices;

a second current steering logic gate similar to said first current steering logic gate;

a pair of amplifying deivces having their common electrodes connected together and having their output electrodes connected together;

a resistor connected in common to the common electrodes of said pair of amplifying devices;

means coupling the input electrode of one of said pair of amplifying devices to the output electrode of one of the first and second amplifying devices in the first current steering logic gate; and means coupling the input electrode of the other of said pair of amplifying devices to the output electrode of one of said first and second amplifying devices in the second current steering logic gate.

2. The combination comprising:

a first current steering logic gate including at least first, second and third amplifying devices each having an input electrode, an output electrode and a common electrode; a resistor having one terminal connected in common to each said common electrode; means for connecting the input electrode of the first amplifying device to a point of fixed potential; a second resistor having one terminal connected to the output electrode of the first amplifying device; a third resistor having one terminal connected in common to the output electrodes of the second and third amplifying devices; and means for applying input signals at the input electrodes of the second and third amplifying devices;

a second current steering logic gate similar to said first current steering logic gate;

a pair of amplifying devices having their common electrodes connected together and having their output electrodes connected together;

a resistor connected in common to the common electrodes of said pair of amplifying devices;

means coupling the input electrode of one of said pair of amplifying devices to the output electrode of one of the first and second amplifying devices in the first current steering logic gate; and means coupling the input electrode of the other of said pair of amplifying devices to the output electrode of one of said first and second amplifying devices in the second current steering logic gate.

3. The combination comprising:

a first current steering logic gate including at least first, second and third amplifying devices each having an input electrode, an output electrode and a common electrode; substantially constant current means connected in common to each said common electrode; means for connecting the input electrode of the first amplifying device to a point of fixed potential; a second resistor having one terminal connected to the output electrode of the first amplifying device; a third resistor having one terminal connected in common to the output electrodes of the second and third amplifying devices; and means for applying input signals at the input electrodes of the second and third amplifying devices;

a second current steering logic gate similar to said first current steering logic gate;

a pair of amplifying devices having their common electrodes connected together and having their output electrodes connected together;

a resistor connected in common to the common electrodes of said pair of amplifying devices;

means coupling the input electrode of one of said pair of amplifying devices to the output electrode of one of the first and second amplifying devices in the first current steering logic gate; and means coupling the input electrode of the other of said pair of amplifying devices to the output electrode of one of said first and second amplifying devices in the second current steering logic gate.

4. The combination comprising:

a first current steering logic gate including at least first, second and third transistors each having a base electrode, an emitter electrode and a collector electrode; a resistor having one terminal connected in common to each said emitter electrode; means for connecting the base electrode of the first transistor to a point of fixed potential; first impedance means connected in the collector circuit of the first transistor; second impedance means connected in a circuit common to the collector electrodes of the second and third transistors; and means for coupling input signals to the base electrodes of the second and third transistors;

a second current steering logic gate similar to said first current steering logic gate;

a pair of transistors having their emitter electrodes connected together and having their collector electrodes connected together, and being connected in the common collector configuration;

a resistor connected in common to the emitter electrodes of said pair of transistors;

means coupling the base electrode of one of said pair of transistors to the collector electrode of one of the first and second transistors in the first current steering logic gate; and means coupling the base electrode of the other of said pair of transistors to the collector electrode of one of said first and second transistors in the second current steering logic gate.

5. The combination comprising:

a first current steering logic gate including at least first, second and third transistors each having a base electrode, an emitter electrode and a collector electrode; a resistor having one terminal connected in common to each said emitter electrode; means for connecting the base electrode of the first transistor to a point of fixed potential; a second resistor having one terminal connected to the collector electrode of the first transistor; a third resistor having one terminal connected in common to the collector electrodes of the second and third transistors; means for coupling operating potentials to the other ends of said first, second and third resistors; and means for coupling input signals to the base electrodes of the second and third transistors;

a second current steering logic gate similar to said first current steering logic gate;

a pair of transistors connected in the common collector configuration and having their emitter electrodes connected together;

a resistor connected in common to the emitter electrodes of said pair of transistors;

means coupling the base electrode of one of said pair of transistors to the collector electrode of one of the first and second transistors in the first current steering logic gate; and means coupling the base electrode of the other of said pair of transistors to the collector electrode of one of said first and second transistors in the second current steering logic gate.

6. The combination comprising:

a first current steering logic gate including at least first, second and third transistors each having a base electrode, an emitter electrode and a collector electrode; substantially constant means connected in common to each said emitter electrode; means for connecting the base electrode of the first transistor to a point of fixed potential; a second resistor connected in the collector circuit of the first transistor; a third resistor connected in a circuit common to the collector electrodes of the second and third transistors; and means for coupling input signals to the base electrodes of the second and third transistors;

a second current steering logic gate similar to said first current steering logic gate;

a pair of transistors connected in the common collector configuration and having their emitter electrodes connected together;

a resistor connected in common to the emitter electrodes of said pair of transistors;

means coupling the base electrode of one of said pair of transistors to the collector electrode of one of the first and second transistors in the first current steering logic gate; and means coupling the base electrode of the other of said pair of transistors to the collector electrode of one of said first and second transistors in the second current steering logic gate.

7. The combination comprising:

a first current steering logic gate having first and second, complementary outputs;

a second current steering logic gate having first and second, complementary outputs;

an emitter follower logic gate including at least first and second transistors;

means for coupling one of the first and second outputs of the first current steering logic gate to the base of the first transistor; and means for coupling one of the first and second outputs of the second current steering logic gate to the base of the second transistor.

8. The combination comprising:

a first current steering logic gate having first and second output terminals for deriving complementary outputs;

a first transistor connected as an emitter follower and having its base coupled to the first output terminal;

a second transistor connected as an emitter follower and having its base coupled to the second output terminal;

a second current steering logic gate having first and second output terminals for deriving complementary outputs;

a third transistor connected as an emitter follower and having its base connected to the first output terminal of the second logic gate;

a fourth transistor connected as an emitter follower and having its base connected to the second output terminal of the second logic gate; and means for connecting the emitter of one of the first and second transistors directly to the emitter of one of the third and fourth transistors.

9. The combination comprising:

a first current steering logic gate having first and second output terminals for deriving complementary outputs;

a first transistor connected as an emitter follower and having its base coupled to the first output terminal;

a second transistor connected as an emitter follower and having its base coupled to the second output terminal;

a second current steering logic gate having first and second output terminals for deriving complementary outputs;

a third transistor connected as an emitter follower and having its base connected to the first output terminal of the second logic gate;

a fourth transistor connected as an emitter follower and having its base connected to the second output terminal of the second logic gate; and means for connecting the collecter-emitter path of one of the first and second transistors in parallel with the collector-emitter path of one of the third and fourth transistors.

References Cited

UNITED STATES PATENTS 3,328,603 6/1967 Dunn et al. -------- 307—215

ARTHUR GAUSS, *Primary Examiner.*

ROBERT H. PLOTKIN, *Assistant Examiner.*

U.S. Cl. X.R.

307—215, 218; 328—92

Disclaimer 3,430,071.—*Alfredo S. Sheng*, Cherry Hill, N.J. LOGIC CIRCUIT. Patent dated Feb. 25, 1969. Disclaimer filed Aug. 12, 1969, by the assignee, *RCA Corporation.*

Hereby disclaims claims 1 through 9, inclusive, of said patent.

[*Official Gazette December 9, 1969.*]